(12) United States Patent
Mizuno et al.

(10) Patent No.: US 12,508,825 B2
(45) Date of Patent: Dec. 30, 2025

(54) CONVEYANCE CONTROL DEVICE, CONVEYANCE CONTROL METHOD, AND NON-TRANSITORY COMPUTER-READABLE MEDIUM STORING COMPUTER READABLE INSTRUCTIONS

(71) Applicant: BROTHER KOGYO KABUSHIKI KAISHA, Nagoya (JP)

(72) Inventors: Kodai Mizuno, Hekinan (JP); Takeshi Watanabe, Nagoya (JP); Shuichi Tamaki, Nagoya (JP); Akira Shinoda, Obu (JP); Kenji Sato, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/132,917

(22) Filed: Dec. 23, 2020

(65) Prior Publication Data

US 2021/0198063 A1    Jul. 1, 2021

(30) Foreign Application Priority Data

Dec. 25, 2019  (JP) .................. 2019-234067

(51) Int. Cl.
   *B41J 13/00*    (2006.01)
   *B41J 3/407*    (2006.01)
   (Continued)

(52) U.S. Cl.
   CPC ........... *B41J 13/0009* (2013.01); *B41J 3/543* (2013.01); *B41J 11/0015* (2013.01);
   (Continued)

(58) Field of Classification Search
   CPC .. B41J 13/0018; B41J 13/009; B41J 11/0015; B41J 11/009; B41J 11/06; B41J 3/4078; B41J 3/543; D06P 5/30
   See application file for complete search history.

(56) References Cited

U.S. PATENT DOCUMENTS 10,189,278 B1   1/2019 Friedrich et al.
2006/0207448 A1*  9/2006 Fresener ............. B41F 15/0863
                                                          101/115
(Continued)

FOREIGN PATENT DOCUMENTS

CN    101376297 A    3/2009
CN    102582244 A    7/2012
(Continued)

OTHER PUBLICATIONS

Extended European Search Report issued on Apr. 13, 2021 in related European Patent Application No. 20216839.9.
(Continued)

*Primary Examiner* — Douglas X Rodriguez
*Assistant Examiner* — Kendrick X Liu
(74) *Attorney, Agent, or Firm* — K&L Gates LLP

(57) ABSTRACT

A conveyance control device of the present disclosure is provided with a CPU that controls a platen conveyance mechanism that conveys a platen from a preparation position of the platen to one of a plurality of printers via a pretreatment device that performs pretreatment on a cloth placed on the platen. The CPU performs determination processing of determining, on a basis of the recording medium placed on the platen, which of the plurality of printers the platen is to be conveyed to. Thus, conveyance destinations of the platens are allocated to the plurality of printers. Thus, the platen is conveyed to the printer suited to the recording medium, and a print processing volume in a certain period is therefore increased.

12 Claims, 12 Drawing Sheets

(51) Int. Cl.
  *B41J 3/54* (2006.01)
  *B41J 11/00* (2006.01)
  *B41J 11/06* (2006.01)
  *B41J 29/38* (2006.01)
  *D06P 5/30* (2006.01)

(52) U.S. Cl.
  CPC .............. *B41J 11/009* (2013.01); *B41J 11/06* (2013.01); *B41J 13/0018* (2013.01); *B41J 29/38* (2013.01); *D06P 5/30* (2013.01); *B41J 3/4078* (2013.01)

(56) References Cited

U.S. PATENT DOCUMENTS

| | | | |
|---|---|---|---|
| 2006/0249039 A1* | 11/2006 | Feldman | B41J 3/546 101/115 |
| 2007/0216924 A1* | 9/2007 | Watanabe | H04N 1/62 358/1.9 |
| 2009/0056567 A1 | 3/2009 | Ando et al. | |
| 2009/0056569 A1 | 3/2009 | Ando et al. | |
| 2009/0097044 A1* | 4/2009 | Zach | B41J 3/543 358/1.8 |
| 2013/0269551 A1 | 10/2013 | Till et al. | |
| 2013/0293652 A1* | 11/2013 | Spence | B65H 3/0816 271/225 |
| 2015/0077488 A1* | 3/2015 | Mozel | D06P 1/673 347/96 |
| 2015/0273866 A1 | 10/2015 | Sakai | |
| 2018/0056679 A1 | 3/2018 | Vest et al. | |
| 2018/0264845 A1 | 9/2018 | Gertlowski et al. | |
| 2018/0339510 A1 | 11/2018 | Ben-Zur et al. | |
| 2019/0111709 A1 | 4/2019 | Weber et al. | |
| 2019/0193422 A1 | 6/2019 | Ferrari et al. | |
| 2019/0248128 A1 | 8/2019 | Sharp et al. | |
| 2019/0299663 A1 | 10/2019 | Takagiwa | |
| 2020/0230946 A1 | 7/2020 | Li et al. | |
| 2021/0107291 A1 | 4/2021 | Hong et al. | |
| 2021/0331506 A1* | 10/2021 | Schiestl | B41M 1/12 |
| 2022/0212462 A1* | 7/2022 | Friedrich | B41J 3/4078 |

FOREIGN PATENT DOCUMENTS

| | | |
|---|---|---|
| CN | 204774081 U | 11/2015 |
| CN | 205523001 U | 8/2016 |
| CN | 107310268 A | 11/2017 |
| CN | 107487070 A | 12/2017 |
| CN | 108394185 A | 8/2018 |
| CN | 109435501 A | 3/2019 |
| CN | 109664613 A | 4/2019 |
| CN | 109890616 A | 6/2019 |
| EP | 2033784 A1 | 3/2009 |
| EP | 1981715 | 9/2014 |
| EP | 1981715 B1 | 9/2014 |
| JP | 2001162898 A | 6/2001 |
| JP | 2001331292 A | 11/2001 |
| JP | 2005059280 A | 3/2005 |
| JP | 2007118256 A | 5/2007 |
| JP | 2015116812 A | 6/2015 |
| JP | 2015132896 A | 7/2015 |
| JP | 2015183331 A | 10/2015 |
| WO | 2018060823 A | 4/2018 |
| WO | 2019/205473 A1 | 10/2019 |

OTHER PUBLICATIONS

Extended European Search Report issued on Apr. 19, 2021 in related European Patent Application No. 20216841.5.
Chinese Office Action mailed Feb. 11, 2022, in corresponding Chinese Patent Application No. 202011501935.X (13 pages).
New U.S. patent application claiming priority to JP Application No. 2019-234066.
Chinese Office Action mailed Mar. 1, 2022, in corresponding Chinese Patent Application No. 202011510224.9 (15 pages).
Office Action issued in corresponding Chinese Patent Application No. 202011501935.X, dated Sep. 30, 2022. (3 pages.).
Office Action issued in related European Patent Application No. 20216839.9, dated Nov. 23, 2022. (8 pages.).
Office Action issued in related European Patent Application No. 20216841.5, dated Nov. 23, 2022. (9 pages.).
Office Action issued in related Chinese Patent Application No. 202011501935.X, dated Apr. 1, 2023. (3 pages.).
Office Action issued in related U.S. Appl. No. 17/132,907, dated Sep. 26, 2022. (9 pages.).
Final Office Action issued in corresponding U.S. Appl. No. 17/132,907, dated May 8, 2023.
Non-Final Office Action issued in corresponding U.S. Appl. No. 17/132,907, dated Sep. 22, 2023, pp. 1-11.
Office Action issued in related Japanese Patent Application No. 2019-234067 dated May 23, 2023. (3 pages.).
Office Action issued in related Japanese Patent Application No. 2019-234066, dated May 23, 2023. (3 pages.).
Office Action issued in related Japanese Patent Application No. 2019-234066, dated Dec. 19, 2023. (2 pages.).
Office Action issued in related European Patent Application No. 20216839.9, dated Dec. 6, 2023. (5 pages.).
Office Action issued in related European Patent Application No. 20216841.5, dated Dec. 6, 2023. (5 pages.).
Office Action issued in corresponding U.S. Appl. No. 17/132,907 dated Jul. 5, 2024. (10 pages.).

* cited by examiner

FIG. 8A

| PRINTER SPECIFICATION | | | |
|---|---|---|---|
| COLOR | COLOR | WHITE + COLOR | WHITE + COLOR + FEATURE COLOR |
| INK TYPE | INK FOR COTTON | INK FOR SYNTHETIC FIBERS | |
| COMPATIBLE PLATEN SIZE | SIZE L | SIZE M | SIZE S |
| COMPATIBLE PRINTING SIZE | W - X INCHES (W), Y - Z INCHES (H) | | |

| PRINTER SPECIFICATION | |
|---|---|
| COLOR | |
| INK TYPE | |
| COMPATIBLE PLATEN SIZE | |
| COMPATIBLE PRINTING SIZE | |

| PRINTER SPECIFICATION | |
|---|---|
| COLOR | COLOR |
| INK TYPE | INK FOR SYNTHETIC FIBERS |
| COMPATIBLE PLATEN SIZE | SIZE L |
| COMPATIBLE PRINTING SIZE | X INCHES (W), Z INCHES (H) |

FIG. 9

| STATE | PRIORITY | DETAILS OF STATE | SUPPLEMENTARY INFORMATION |
|---|---|---|---|
| PRINTING POSSIBLE | 1 | PRINTING POSSIBLE (NO PLATEN) | |
| | 2 | PRINTING IN PROGRESS (20 SECONDS OR LESS UNTIL PRINTING IS COMPLETE) | PRIORITY IS HIGHER THE SHORTER THE TIME PERIOD UNTIL START |
| | 3 | PRINTING IN PROGRESS (20 SECONDS OR MORE AND 40 SECONDS OR LESS UNTIL PRINTING IS COMPLETE) | |
| | 4 | PRINTING IN PROGRESS (10 SECONDS FOR CONVEYANCE AND 40 SECONDS OR MORE AND 60 SECONDS OR LESS FOR PRINTING) | |
| | 5 | PRINTING IN PROGRESS (30 SECONDS FOR MAINTENANCE AND 40 SECONDS OR MORE AND 60 SECONDS OR LESS FOR PRINTING) | |
| PRINTING NOT POSSIBLE | 6 | PERIODIC REPLACEMENT IN PROGRESS (INK REPLENISHMENT IN PROGRESS) | PERIODIC OPERATION |
| | 7 | PLATEN DISCHARGE IN PROGRESS | PERIODIC OPERATION |
| | 8 | PURGING IN PROGRESS | PERIODIC OPERATION |
| | × | POWER SOURCE OFF | IRREGULAR OPERATION |
| | × | MACHINE ERROR (SUCH AS INK EMPTY) | IRREGULAR OPERATION |
| | × | OPENING OF PRINTER COVER | IRREGULAR OPERATION |

104A

CONVEYANCE CONTROL DEVICE, CONVEYANCE CONTROL METHOD, AND NON-TRANSITORY COMPUTER-READABLE MEDIUM STORING COMPUTER READABLE INSTRUCTIONS

CROSS-REFERENCE TO RELATED APPLICATION

This application claims priority to Japanese Patent Application No. 2019-234067 filed Dec. 25, 2019. The contents of the foregoing application are hereby incorporated herein by reference.

BACKGROUND

The present disclosure relates to a conveyance control device, a conveyance control method, and a non-transitory computer-readable medium storing computer-readable instructions.

A printing device being provided with a pretreatment agent application portion and a print portion is known. The pretreatment agent application portion applies a pretreatment agent onto a recording medium placed on a platen. A movement mechanism conveys the platen from the pretreatment agent application portion to the print portion, and the print portion performs printing by applying a printing liquid onto the recording medium to which the pretreatment agent has been applied.

SUMMARY

In order to increase a print processing volume in a certain period, it is conceivable to provide a print system that is provided with a plurality of printers. In the print system, it is conceivable to provide a conveyance portion that can convey the platen to a set position, at which the recording medium is set on the platen, to a pretreatment device, and to any one of the plurality of printers. In the print system, when the platen is conveyed to a specific printer only, this is not desirable from a viewpoint of increasing the print processing volume in the certain period.

Embodiments of the broad principles derived herein provide a conveyance control device, a conveyance control method, and a non-transitory computer-readable medium storing computer-readable instructions that increase a print processing number in a certain period.

A conveyance control device according to a first aspect of the present disclosure includes a processor configured to control a conveyance portion, the conveyance portion being configured to convey a platen from a conveyance start position of the platen to one of a plurality of printers via a pretreatment device, the pretreatment device being configured to perform pretreatment on a recording medium placed on the platen, and a memory storing computer-readable instructions that, when executed by the processor, perform processes including: performing determination processing of determining, on a basis of the recording medium placed on the platen, which of the plurality of printers the platen is to be conveyed to.

Since the processor determines the printer to which the platen is to be conveyed on the basis of the recording medium placed on the platen, the platen is conveyed to the printer suited to the recording medium, and a print processing volume in a certain period is therefore increased.

A conveyance control method according to a second aspect of the present disclosure is a method in which a processor controls a conveyance portion, the conveyance portion being configured to convey a platen from a conveyance start position of the platen to one of a plurality of printers via a pretreatment device, the pretreatment device being configured to perform pretreatment on a recording medium placed on the platen, the conveyance control method includes determination processing of determining, on a basis of the recording medium placed on the platen, which of the plurality of printers the platen is to be conveyed to.

A non-transitory computer-readable medium storing computer-readable instructions according to a third aspect of the present disclosure, stores the computer-readable instructions that, when executed by a computer which controls a conveyance portion, the conveyance portion being configured to convey a platen from a conveyance start position of the platen to one of a plurality of printers via a pretreatment device, the pretreatment device being configured to perform pretreatment on a recording medium placed on the platen, performs determination processing of determining, on a basis of the recording medium placed on the platen, which of the plurality of printers the platen is to be conveyed to.

BRIEF DESCRIPTION OF THE DRAWINGS

Embodiments will be described below in detail with reference to the accompanying drawings in which:

FIG. 8(A), FIG. 8(B), and FIG. 8(C) are diagrams showing a printer specification 103A;

FIG. 9 is a priority table 104A; and

DETAILED DESCRIPTION

Figure 1:
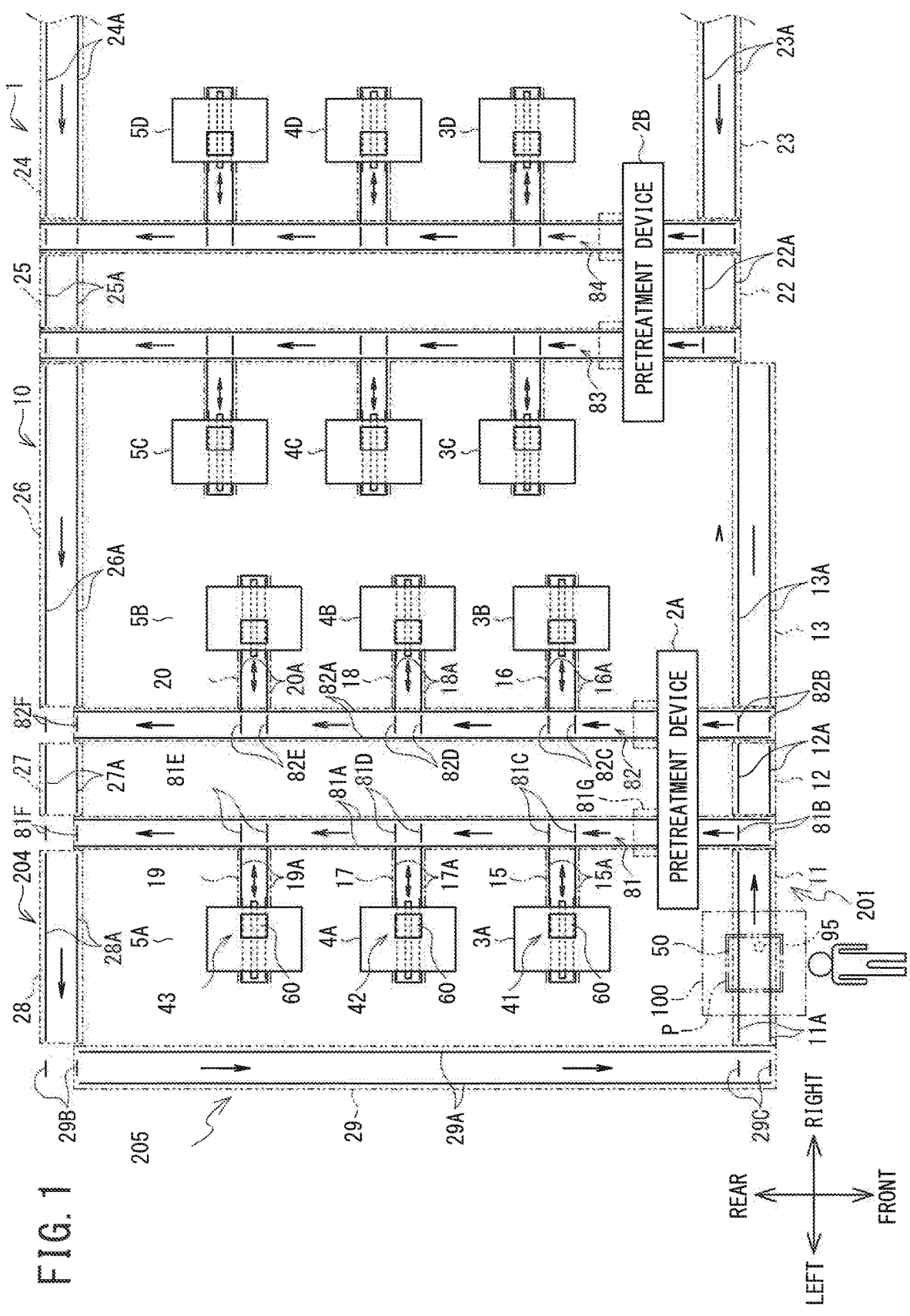
FIG. 1 is a plan view of a print system 1.

An embodiment of the present disclosure will be explained. Left and right, front and rear, and up and down directions shown by arrows in the drawings are used in the following explanation. A print system 1 shown in FIG. 1 is a system that sequentially performs pretreatment and print processing on a recording medium placed on a platen 50 while conveying the platen 50. The recording medium is a cloth, such as a T-shirt or the like. The material of the cloth is cotton, polyester, a mixture of cotton and polyester, or the like.

The configuration of the print system 1 will be explained with reference to FIG. 1. The print system 1 is provided with a platen conveyance mechanism 10, a pretreatment devices 2A and 2B, printers 3A to 3D, 4A to 4D, and 5A to 5D, a code reader 95, and the like. The platen conveyance mechanism 10 is provided with a first lane 81, a second lane 82, a third lane 83, and a fourth lane 84. The first lane 81 to the fourth lane 84 respectively extend in the front-rear direction in parallel to each other, and convey the platen 50. The pretreatment device 2A is disposed to the front of the first lane 81 and the second lane 82, and performs the pretreatment on a cloth P placed on the platen 50. The pretreatment device 2B is disposed to the front of the third lane 83 and the fourth lane 84, and performs the pretreatment on the cloth P placed on the platen 50.

The pretreatment device 2A, 2B, are disposed to the front of the print system 1, and performs the pretreatment on a cloth P placed on the platen 50. For example, the pretreatment device 2 is provided with an application portion and a heat treatment portion that are not shown in the drawings. The application portion sprays a pretreatment agent using a spray, and applies the pretreatment agent onto the cloth P placed on the platen 50. The pretreatment agent is a base coat agent that is applied before ink is applied onto the cloth P. The pretreatment agent is a liquid to form a film between fibers of the cloth so that the ink is fixed on the cloth more effectively, and contains resin components, for example. The pretreatment agent contains, for example, a divalent metal salt (such as CaCl2, Ca(NO2)2, or the like), and enhances color development of the ink. For example, the heat treatment portion is a heat press portion, which dries the pretreatment agent by pressurizing the cloth P at a high temperature. Thus, fixation of the pretreatment agent on the cloth P is improved, and image quality is improved. The heat press portion of the pretreatment device 2A, for example, performs a heat press operation at a temperature (110° C., for example) for synthetic fibers. The heat press portion of the pretreatment device 2B, for example, performs the heat press operation at a temperature (180° C., for example) for cotton. The pretreatment devices 2A and 2B may omit one of the application portion and the heat treatment portion.

In the first lane 81, the printers 3A, 4A, and 5A are aligned in the front-rear direction to the rear of the pretreatment device 2A. In the second lane 82, the printers 3B, 4B, and 5B are aligned in the front-rear direction to the rear of the pretreatment device 2A. In the third lane 83, the printers 3C, 4C, and 5C are aligned in the front-rear direction to the rear of the pretreatment device 2B. In the fourth lane 84, the printers 3D, 4D, and 5D are aligned in the front-rear direction to the rear of the pretreatment device 2B. The printers 3A to 5D are inkjet printers. The printers 3A to 5D perform printing by ejecting ink from nozzles of a print head onto the cloth P after the pretreatment that is placed on the platen 50.

The printers 3A to 3D eject seven types of ink (white (W), black (K), yellow (Y), cyan (C), magenta (M), green (G), and red (R) inks). Green (G) and red (R) are described below as feature colors but the present disclosure is not limited to this example. The ink of the feature color may be fluorescent ink or the like. The printers 4A to 4D eject five types of the ink (white (W), black (K), yellow (Y), cyan (C), and magenta (M) inks). The printers 5A to 5D eject four types of the ink (black (K), yellow (Y), cyan (C), and magenta (M) inks). Each of the inks of the printers 3A, 3B, 4A, 4B, 5A, and 5B are inks for synthetic fibers. Each of the inks of the printers 3C, 3D, 4C, 4D, 5C, and 5D are inks for cotton. The printers 3A, 4A, 5A, 3C, 4C, and 5C are printers compatible with the large sized (L) platen 50. The printers 3B, 4B, 5B, 3D, 4D, and 5D are printers compatible with the regular sized platen 50.

The platen conveyance mechanism 10 conveys the platen 50 disposed at a preparation position 100 (to be described later) from the preparation position 100, which is a conveyance start position of the platen 50, to one of the first lane 81 to the fourth lane 84, via the pretreatment device 2A or 2B, printing is performed by any of the printers 3A to 5D, .and once more returns the platen 50 to the preparation position 100. The first lane 81 to the fourth lane 84 respectively extend in the front-rear direction in parallel to each other, and convey the platen 50.

The code reader 95 provided at the preparation position 100 reads out an identification information portion (not shown in the drawings) provided on the cloth P, and inputs identification information to a CPU 101 (to be described later) of the print system 1. The identification information is information to identify the cloth P, and is, for example, information of a one-dimensional code, such as a bar code, a two-dimensional code, such as a QR code, or a three-dimensional code. The identification information includes information of at least a type, color and size of the cloth P, a print color, a print size, and the like.

The configuration of the platen conveyance mechanism 10 will be explained with reference to FIG. 1. The platen conveyance mechanism 10 is provided with at least a shipment line 201, the first lane 81, the second lane 82, the third lane 83, the fourth lane 84, a first return line 204, and a second return line 205. The shipment line 201 is positioned at the forefront of the print system 1 and extends linearly in the left-right direction, and is used to convey the platen 50 toward the first lane 81 to the fourth lane 84. The shipment line 201 is provided with conveyance mechanisms 11, 12, 13, 22, and 23, in that order from the left side. The conveyance mechanisms 11, 12, 13, 22, and 23 respectively extend in the left-right direction, and convey the platen 50 in the rightward direction. The conveyance mechanism 11 is provided at a preparation position 100. The preparation position 100 is a position at which the cloth P is set on the platen 50. The conveyance mechanisms 11, 12, 13, 22, and 23 convey the platen 50 to the right. The first return line 204 is positioned at the rearmost of the print system 1 and extends in the left-right direction. The first return line 204 is provided with conveyance mechanisms 28, 27, 26, 25, and 24 in that order from the left side. Each of the conveyance mechanisms 28, 27, 26, 25, and 24 extends in the left-right direction, and conveys the platen 50 to the left.

A front end portion of the first lane 81 is positioned between the conveyance mechanism 11 and the conveyance mechanism 12. A front end portion of the second lane 82 is positioned between the conveyance mechanism 12 and the conveyance mechanism 13. A front end portion of the third lane 83 is positioned between the conveyance mechanism 13 and the conveyance mechanism 22. A front end portion of the fourth lane 84 is positioned between the conveyance mechanism 22 and the conveyance mechanism 23. Another lane may be further connected to the right-end side of the conveyance mechanism 23.

The first lane 81 extends in the front-rear direction between the shipment line 201 and the first return line 204 to be described later. The first lane 81 conveys the platen 50 received from the shipment line 201 to the pretreatment device 2A. The pretreatment device 2A performs the pretreatment on the cloth P attached to the platen 50. The first lane 81 conveys the platen 50 after the pretreatment to one of the printers 3A to 5A, and delivers the platen 50 to the first return line 204. The second lane 82 extends in the front-rear direction between the shipment line 201 and the first return line 204. The second lane 82 conveys the platen 50 received from the shipment line 201 to the pretreatment device 2A. The pretreatment device 2A performs the pretreatment on the cloth P attached to the platen 50. The second lane 82 conveys the platen 50 after the pretreatment to one of the printers 3B to 5B, and delivers the platen 50 to the first return line 204. The third lane 83 extends in the front-rear direction between the shipment line 201 and the first return line 204. The third lane 83 conveys the platen 50 received from the shipment line 201 to the pretreatment device 2B. The pretreatment device 2B performs the pretreatment on the cloth P attached to the platen 50. The third lane 83 conveys the platen 50 after the pretreatment to one of the printers 3C to 5C, and delivers the platen 50 to the first return line 204. The fourth lane 84 extends in the front-rear direction between the shipment line 201 and the first return line 204. The fourth lane 84 conveys the platen 50 received from the shipment line 201 to the pretreatment device 2B. The pretreatment device 2B performs the pretreatment on the cloth P attached to the platen 50. The fourth lane 84 conveys the platen 50 after the pretreatment to one of the printers 3D to 5D, and delivers the platen 50 to the first return line 204.

The first lane 81 is provided with conveyance mechanisms 15, 17 and 19, and print conveyance mechanisms 41 to 43. The first lane 81 extends to the rear from the right end side of the conveyance mechanism 11, passes through the interior of the pretreatment device 2A, and further extends to the rear. The first lane 81 receives the platen 50 from the conveyance mechanism 11, passes through the pretreatment device 2A, and conveys the platen 50 to the rear. The conveyance mechanism 15 is positioned to the rear of the pretreatment device 2A, and extends to the left from the first lane 81 toward the printer 3A. The conveyance mechanism 15 receives the platen 50 from the first lane 81, and conveys the platen 50 toward the printer 3A. The conveyance mechanism 15 conveys the platen 50 to the right after the printing is completed by the printer 3A, and transfers the platen 50 to the first lane 81.

The conveyance mechanism 17 is positioned to the rear of the conveyance mechanism 15, and extends to the left from the first lane 81 toward the printer 4A. The conveyance mechanism 17 receives the platen 50 from the first lane 81, and conveys the platen 50 toward the printer 4A. The conveyance mechanism 17 conveys the platen 50 to the right after the printing is completed by the printer 4A, and transfers the platen 50 to the first lane 81. The conveyance mechanism 19 is positioned to the rear of the conveyance mechanism 17, and extends to the left from the first lane 81 toward the printer 5A. The conveyance mechanism 19 receives the platen 50 from the first lane 81, and conveys the platen 50 toward the printer 5A. The conveyance mechanism 19 conveys the platen 50 to the right after the printing is completed by the printer 5A, and transfers the platen 50 to the first lane 81.

The printer 3A is provided with the print conveyance mechanism 41. The print conveyance mechanism 41 can convey the platen 50 in the left-right direction. The print conveyance mechanism 41 is provided with a platen support member 60 and a conveyance motor 137 (refer to FIG. 3). The platen support member 60 receives the platen 50 from the conveyance mechanism 15 and supports the platen 50. The conveyance motor 137 conveys the platen support member 60 in the left-right direction. The printer 4A is provided with the print conveyance mechanism 42, and the printer 5A is provided with the print conveyance mechanism 43. The print conveyance mechanisms 42 and 43 have the same configuration as the print conveyance mechanism 41, and an explanation thereof is thus omitted here.

The conveyance mechanisms 12, 13, and 22 of the shipment line 201 may respectively convey the platen 50 toward the second lane 82 to the fourth lane 84. The second lane 82 has the same configuration as and is left-right symmetrical with the first lane 81. The third lane 83 has the same configuration as the first lane 81. The fourth lane 84 has the same configuration as the second lane 82. The conveyance mechanisms 27, 26, and 25 of the first return line 204 may convey the platen 50 respectively received from the second lane 82 to the fourth lane 84 to the left.

A belt configuration of the platen conveyance mechanism 10 will be explained with reference to FIG. 1. First, the belt configuration of the shipment line 201 will be explained. The conveyance mechanism 11 is provided with a pair of lateral belts 11A. The lateral belts 11A are provided at both end portions of the conveyance mechanism 11 in a direction orthogonal to a conveyance direction, and may convey the platen 50 to the right.

The first lane 81 is provided with a pair of longitudinal belts 81A and pairs of lateral lifting belts 81B to 81E. The pair of longitudinal belts 81A are provided at both end portions of the first lane 81 in a direction orthogonal to the conveyance direction. The pair of longitudinal belts 81A convey the platen 50 to the rear. The pairs of lateral lifting belts 81B to 81E are disposed between the pair of longitudinal belts 81A. The pair of lateral lifting belts 81B are provided at the front end portion of the first lane 81 such that they can be raised and lowered. The pair of lateral lifting belts 81B convey the platen 50 to the right. The pair of lateral lifting belts 81C are provided on the right side of the conveyance mechanism 15 such that they can be raised and lowered. The pair of lateral lifting belts 81D are provided on the right side of the conveyance mechanism 17 such that they can be raised and lowered. The pair of lateral lifting belts 81E are provided on the right side of the conveyance mechanism 19 such that they can be raised and lowered. The pairs of lateral lifting belts 81C to 81E convey the platen 50 to the left. The pair of lateral lifting belts 81F are provided at the rear end portion of the first lane 81 such that they can be raised and lowered. The pair of lateral lifting belts 81F convey the platen 50 to the left.

The conveyance mechanisms 15, 17 and 19 are respectively provided with pairs of lateral conveyance belts 15A, 17A and 19A. The pairs of lateral conveyance belts 15A, 17A and 19A are respectively provided at both end portions of the conveyance mechanisms 15, 17 and 19 in a direction orthogonal to the conveyance direction such that they can be raised and lowered.

The conveyance mechanisms 24, 25, 26, 27 and 28 are respectively provided with pairs of lateral belts 24A, 25A, 26A, 27A and 28A that extend in the conveyance direction (Left direction), and convey the platen 50 in the conveyance direction in the conveyance mechanisms 24, 25, 26, 27 and 28. A conveyance mechanism 29 is provided with a pair of longitudinal belts 29A and pairs of lateral lifting belts 29B and 29C. The pair of longitudinal belts 29A are provided at both end portions of the conveyance mechanism 29 in a direction orthogonal to the conveyance direction. The pair of longitudinal belts 29A convey the platen 50 to the front. The pairs of lateral lifting belts 28B and 29C are disposed between the pair of longitudinal belts 29A, and can be raised and lowered on the left side of the conveyance mechanisms 28 and 11, respectively. The pair of lateral lifting belts 29B convey the platen 50 to the left, and the pair of lateral lifting belts 29C convey the platen 50 to the right.

The second lane 82 is provided with conveyance mechanisms 16, 18, and 20. The conveyance mechanisms 16, 18, and 20 are respectively provided with pairs of lateral conveyance belts 16A, 18A, and 20A. The pairs of lateral conveyance belts 16A, 18A and 20A are respectively provided at both end portions of the conveyance mechanisms 16, 18 and 20 in a direction orthogonal to the conveyance direction such that they can be raised and lowered. The conveyance mechanisms 16, 18, and 20 have the same structure as the conveyance mechanisms 15, 17, and 19, respectively. The second lane 82 receives the platen 50 from the conveyance mechanism 12, and conveys the platen 50 to the rear through the pretreatment device 2A.

The conveyance mechanism 16 is positioned to the rear of the pretreatment device 2A, and extends to the right from the second lane 82 toward the printer 3B. The conveyance mechanism 16 receives the platen 50 from the second lane 82, and conveys the platen 50 toward the printer 3B. The conveyance mechanism 16 conveys the platen 50 to the left after the printing is completed by the printer 3B, and transfers the platen 50 to the second lane 82. The conveyance mechanism 18 is positioned to the rear of the conveyance mechanism 16, and extends to the right from the second lane 82 toward the printer 4B. The conveyance mechanism 18 receives the platen 50 from the second lane 82, and conveys the platen 50 toward the printer 4B. The conveyance mechanism 18 conveys the platen 50 to the left after the printing is completed by the printer 4B, and transfers the platen 50 to the second lane 82. The conveyance mechanism 20 is positioned to the rear of the conveyance mechanism 18, and extends to the right from the second lane 82 toward the printer 5B. The conveyance mechanism 20 receives the platen 50 from the second lane 82, and conveys the platen 50 toward the printer 5B. The conveyance mechanism 20 conveys the platen 50 to the left after the printing is completed by the printer 5B, and transfers the platen 50 to the second lane 82.

The second lane 82 is provided with a pair of longitudinal belts 82A and pairs of lateral lifting belts 82B to 82F. The pair of longitudinal belts 82A are provided at both end portions of the second lane 82 in a direction orthogonal to the conveyance direction. The pair of longitudinal belts 82A convey the platen 50 to the rear. The pairs of lateral lifting belts 82B to 82F are disposed between the pair of longitudinal belts 82A. The pair of lateral lifting belts 82B are provided at the front end portion of the second lane 82 such that they can be raised and lowered. The pair of lateral lifting belts 82B convey the platen 50 to the right. The pair of lateral lifting belts 82C are provided on the left side of the conveyance mechanism 16 such that they can be raised and lowered. The pair of lateral lifting belts 82D are provided on the left side of the conveyance mechanism 18 such that they can be raised and lowered. The pair of lateral lifting belts 82E are provided on the left side of the conveyance mechanism 20 such that they can be raised and lowered. The pairs of lateral lifting belts 82C to 82E convey the platen 50 in the left-right direction The pair of lateral lifting belts 82F are provided at the rear end portion of the second lane 82 such that they can be raised and lowered. The pair of lateral lifting belts 82F convey the platen 50 to the left. Note that the belt configuration of the third lane 83 is the same structure as the belt configuration of the first lane 81, and the belt configuration of the fourth lane 84 is the same structure as the belt configuration of the second lane 82, and an explanation thereof is thus omitted here.

Figure 3:
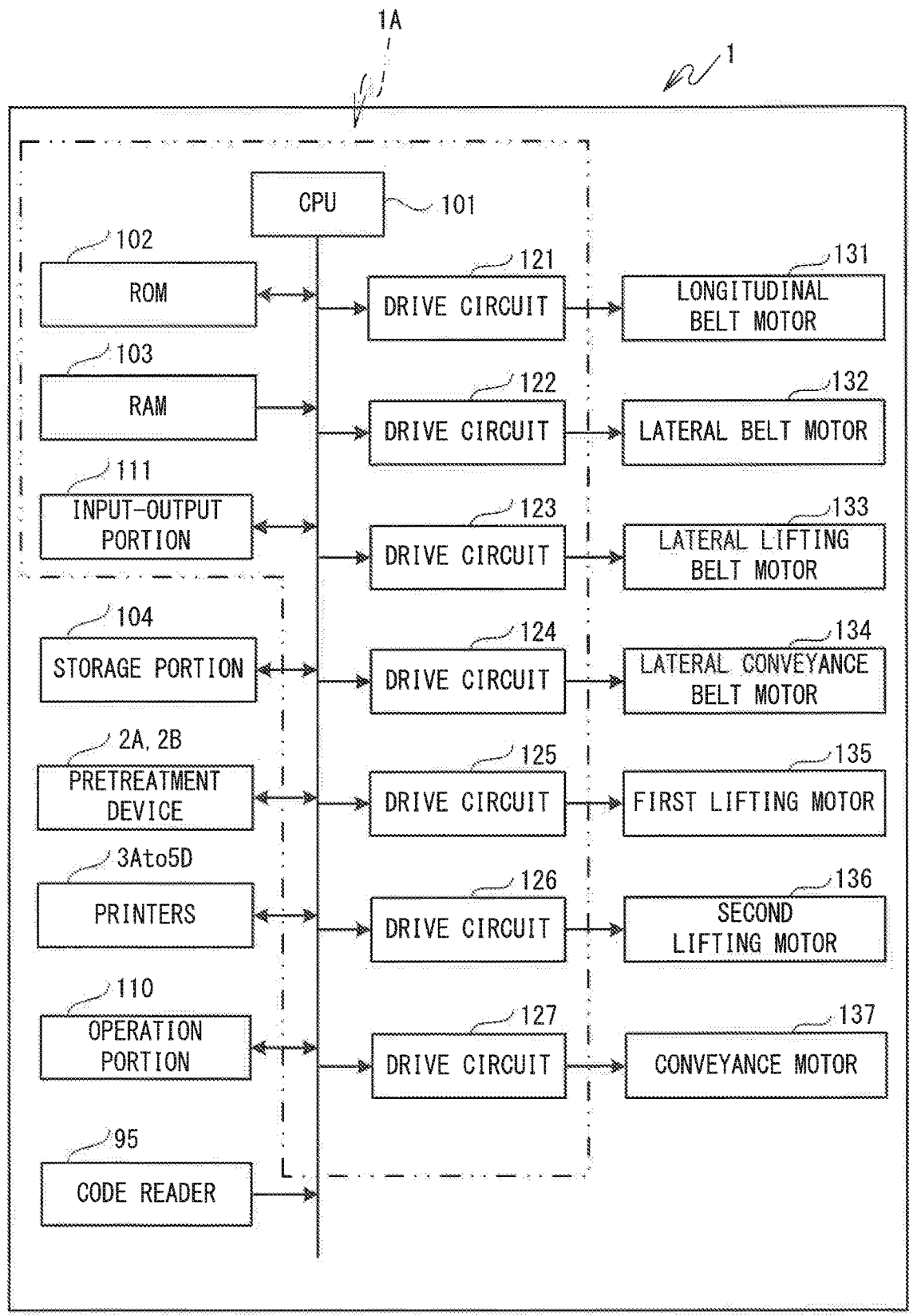
FIG. 3 is a block diagram showing an electrical configuration of the print system 1.

As shown in FIG. 3, the platen conveyance mechanism 10 is provided with a longitudinal belt motor 131, a lateral belt motor 132, a lateral lifting belt motor 133, a lateral conveyance belt motor 134, a first lifting motor 135, a second lifting motor 136, the conveyance motor 137, and the like. The longitudinal belt motor 131 is provided so as to correspond to each of the longitudinal belts 29A, 81A, and 82A, and drives each of the belts. The lateral belt motor 132 is provided so as to correspond to each of the lateral belts 11A, 12A, 13A, 22A, 23A, 24A, 25A, 26A, 27A and 28A, and drives each of the belts. The lateral lifting belt motor 133 is provided so as to correspond to each of the lateral lifting belts 81B to 81F and 82B to 82F, and drives each of the belts. The lateral conveyance belt motor 134 is provided so as to correspond to each of the lateral conveyance belts 15A to 20A, and drives each of the belts. The first lifting motor 135 is provided so as to correspond to each of the lateral lifting belts 81B to 81F and 82B to 82F, and raises and lowers each of the belts. The second lifting motor 136 is provided so as to correspond to each of the lateral conveyance belts 15A to 20A, and raises and lowers each of the belts. Note that the third lane 83 and the fourth lane 84 also have the same structure.

Platen Conveyance Operation

An example of the platen conveyance operation by the platen conveyance mechanism 10 will be explained with reference to FIG. 1. Sensors (not shown in the drawings) are respectively disposed at positions of the respective lateral lifting belts, and detect whether the platen 50 is present or not. Note that in a present working example, an operation will be explained when the platen 50 is conveyed to the shipment line 201, the first lane 81, the printer 3A, the first return line 204, and the second return line 205, in that order.

When the conveyance of the platen 50 from the preparation position 100 is instructed, the lateral belts 11A are driven and convey the platen 50 to the right. At this time, the lateral lifting belts 81B are disposed at the same height position as the lateral belts 11A, and deliver the platen 50 from the lateral belts 11A to the lateral lifting belts 81B. After that, the driving of the lateral lifting belts 81B is stopped and the lateral lifting belts 81B are lowered. At the same time, the longitudinal belts 81A are driven. The lateral lifting belts 81B are lowered to be lower than the longitudinal belts 81A, and the platen 50 is placed on the longitudinal belts 81A. The longitudinal belts 81A convey the platen 50 to the rear, and convey the platen 50 to the pretreatment device 2A. The pretreatment device 2A performs the pretreatment on the cloth P. After that, the longitudinal belts 81A further convey the platen 50 to the rear, passing through the pretreatment device 2A, and the platen 50 stands by at a stand-by position 81G.

When the platen 50 is conveyed to the printer 3A, when the platen 50 reaches a position above the lateral lifting belts 81C, the driving of the longitudinal belts 81A is stopped, and the upward movement of the lateral lifting belts 81C is started. The lateral lifting belts 81C are raised to be higher than the longitudinal belts 81A, and are stopped at the same height position as the lateral conveyance belts 15A. The lateral conveyance belts 15A and the longitudinal lifting belts 81C are driven, and deliver the platen 50 from the lateral lifting belts 81C to the lateral conveyance belts 15A. The lateral conveyance belts 15A are driven, and convey the platen 50 toward the printer 3A. The platen 50 is delivered from the lateral conveyance belts 15A to the platen support member 60 (to be described later) provided inside the printer 3A. When the platen 50 is conveyed to the printer 4A, when the platen 50 reaches a position above the lateral lifting belts 81D, the driving of the longitudinal belts 81A is stopped, and the upward movement of the lateral lifting belts 81D is started. The lateral lifting belts 81D are raised to be higher than the longitudinal belts 81A, and are stopped at the same height position as the lateral conveyance belts 17A. The lateral conveyance belts 17A and the lateral lifting belts 81D are driven, and deliver the platen 50 from the lateral lifting belts 81D to the lateral conveyance belts 17A. When the platen 50 is conveyed to the printer 5A, when the platen 50 reaches a position above the lateral lifting belts 81E, the driving of the longitudinal belts 81A is stopped, and the upward movement of the lateral lifting belts 81E is started. The lateral lifting belts 81E are raised to be higher than the longitudinal belts 81A, and are stopped at the same height position as the lateral conveyance belts 19A. The lateral conveyance belts 19A and the lateral lifting belts 81E are driven, and deliver the platen 50 from the lateral lifting belts 81E to the lateral conveyance belts 19A.

When the platen 50 is conveyed to the printer 3A, the platen support member 60 supports the platen 50. The platen support member 60 conveys the platen 50 in the leftward direction. The platen 50 passes through the interior of the printer 3A, and is stopped at a left end position of the printer 3A. When the printing is complete, the platen support member 60 conveys the platen 50 in the rightward direction, and delivers the platen 50 to the lateral conveyance belts 15A. The lateral conveyance belts 15A are driven in the rightward direction, and convey the platen 50 in the rightward direction. The lateral lifting belts 81C are driven in the rightward direction, and deliver the platen 50 from the lateral conveyance belts 15A to the lateral lifting belts 81C. The driving of the lateral lifting belts 81C in the rightward direction is stopped, the lateral lifting belts 81C are lowered, and the platen 50 is placed on the longitudinal belts 81A. Next, the longitudinal belts 81A convey the platen 50 toward the lateral lifting belts 81F.

After that, although not explained in detail, delivery operations are performed in the same manner as described above, and the platen 50 is sequentially delivered from the first lane 81 to the first return line 204, and from the first return line 204 to the second return line 205. Then, the platen 50 is delivered to the conveyance mechanism 11 of the shipment line 201, and returns to the preparation position 100. In a similar manner, the platen 50 may be delivered to one of the second lane 82, the third lane 83, or the fourth lane 84, and the printing may be performed by any one of the printers 3B to 3D. After that, the same operations are performed when the platen 50 is delivered, in order, to the first return line 204, and from the first return line 204 to the second return line 205, is delivered to the conveyance mechanism 11 of the shipment line 201, and returns to the preparation position 100.

Figure 2:
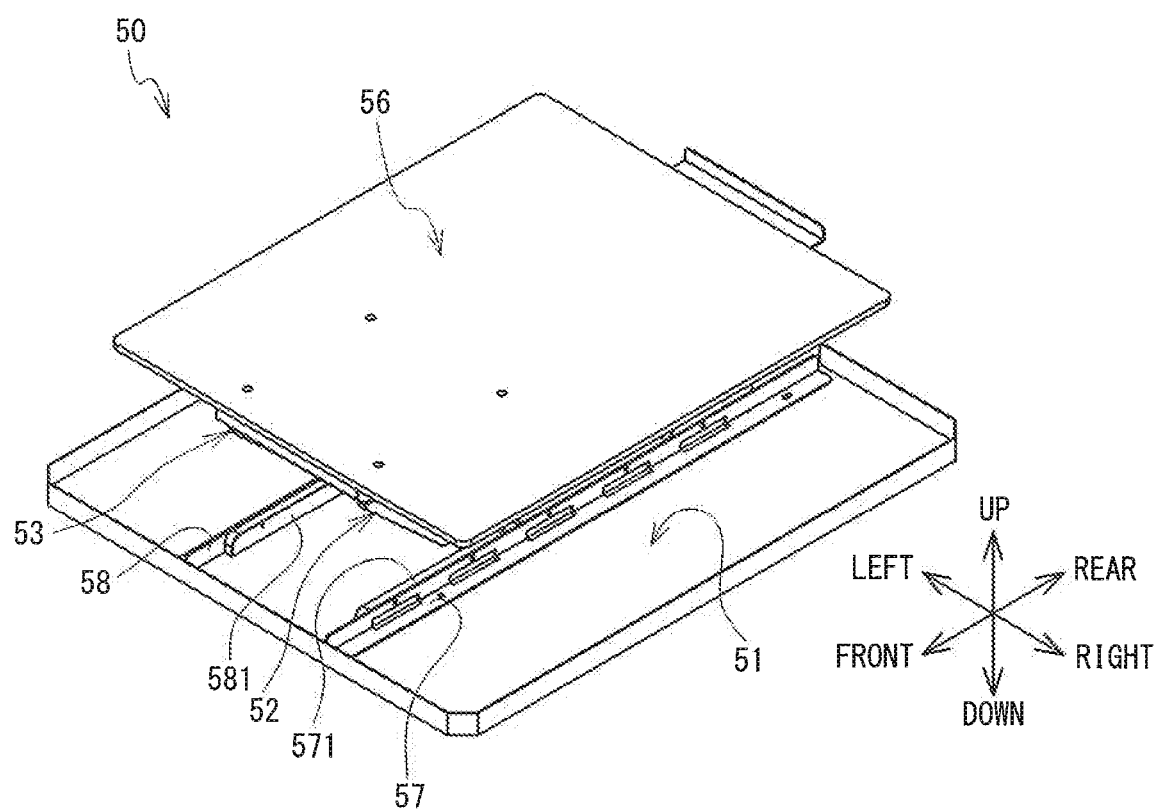
FIG. 2 is a perspective view of a platen 50.

The configuration of the platen 50 will be explained with reference to FIG. 2. The platen 50 is provided with a seat 51, a right side plate 52, a left side plate 53, a bottom plate (not shown in the drawings), a top plate (not shown in the drawings), and an attachment plate 56. The seat 51 has a rectangular shape in a plan view. At a substantially central portion in the left-right direction of the upper surface of the seat 51, a pair of support members (not shown in the drawings), which extend in the front-rear direction and which have an L-shaped cross section, are fixed to positions that are separated from each other in the left-right direction. The right side plate 52 has an inverted L shape in a right side view. On the upper surface of the seat 51, the right side plate 52 is fixed to an inner surface of the right-side support member (not shown in the drawings) using screws (not shown in the drawings) via a long and thin plate-shaped spacer 571 that extends in the front-rear direction. Thus, the right side plate 52 stands on the upper surface of the seat 51. An operator attaches the cloth P to the attachment plate 56. For example, when the cloth P is a T-shirt, the operator attaches the T-shirt to the attachment plate 56 such that a neck side of the T-shirt is directed to the front side and a hem side of the T-shirt is directed to the rear side.

In the same manner as the right side plate 52, on the upper surface of the seat 51, the left side plate 53 is fixed using screws (not shown in the drawings) via a long and thin plate-shaped spacer 581 that extends in the front-rear direction. Thus, the left side plate 53 stands on the upper surface of the seat 51 in parallel with the right side plate 52.

Electrical Configuration of Print System 1

An electrical configuration of the print system 1 will be explained with reference to FIG. 3. The print system 1 is provided with at least a conveyance control device 1A. The conveyance control device 1A is provided with the CPU 101, a ROM 102, a RAM 103, and drive circuits 121 to 127, which are mutually connected via a bus. A storage portion 104, the pretreatment device 2A,2B, the printers 3A to 5D, an operation portion 110, an input-output portion 111, proximity sensors 70 to 77, the code reader 95, the longitudinal belt motor 131, the lateral belt motor 132, the lateral lifting belt motor 133, the lateral conveyance belt motor 134, the first lifting motor 135, the second lifting motor 136, and the conveyance motor 137 are connected to the conveyance control device 1A.

The CPU 101 controls operation of the print system 1. The ROM 102 stores various programs. The RAM 103 temporarily stores various information. The RAM 103 stores a printer specification 103A and the like, to be described later. The storage portion 104 is a non-volatile flash memory, and stores various types of information, such as a priority table 104A to be described later, and the like. The operation portion 110 receives various inputs by the operator. The operation portion 110 may be a touch panel (not shown in the drawings), and may display various types of information, in addition to receiving various inputs. The input-output portion 111 is provided with an SD memory card slot, a USB port, a serial port of another standard, and the like.

The drive circuit 121 controls operation of the longitudinal belt motor 131 on the basis of a control command from the CPU 101. The drive circuit 122 controls operation of the lateral belt motor 132 on the basis of a control command from the CPU 101. The drive circuit 123 controls operation of the lateral lifting belt motor 133 on the basis of a control command from the CPU 101. The drive circuit 124 controls operation of the lateral conveyance belt motor 134 on the basis of a control command from the CPU 101. The drive circuit 125 controls operation of the first lifting motor 135 on the basis of a control command from the CPU 101. The drive circuit 126 controls operation of the second lifting motor 136 on the basis of a control command from the CPU 101. The drive circuit 127 controls operation of the conveyance motor 137 on the basis of a control command from the CPU 101.

Note that a stepping motor may be used as each of the motors included in the platen conveyance mechanism 10. In this case, encoders are respectively connected to the motors, and motor position information is transmitted from each of the encoders to the CPU 101. Thus, the CPU 101 recognizes the positions of the respective motors.

Print Lane Determination Processing

Print lane determination processing will be explained with reference to FIG. 4 to FIG. 9. In the present embodiment, as an example, processing is explained that determines which of the printers 3A to 5D of the first lane 81 to the fourth lane 84 the platen 50, to which the cloth P is attached, is to be conveyed to.

Figure 4:
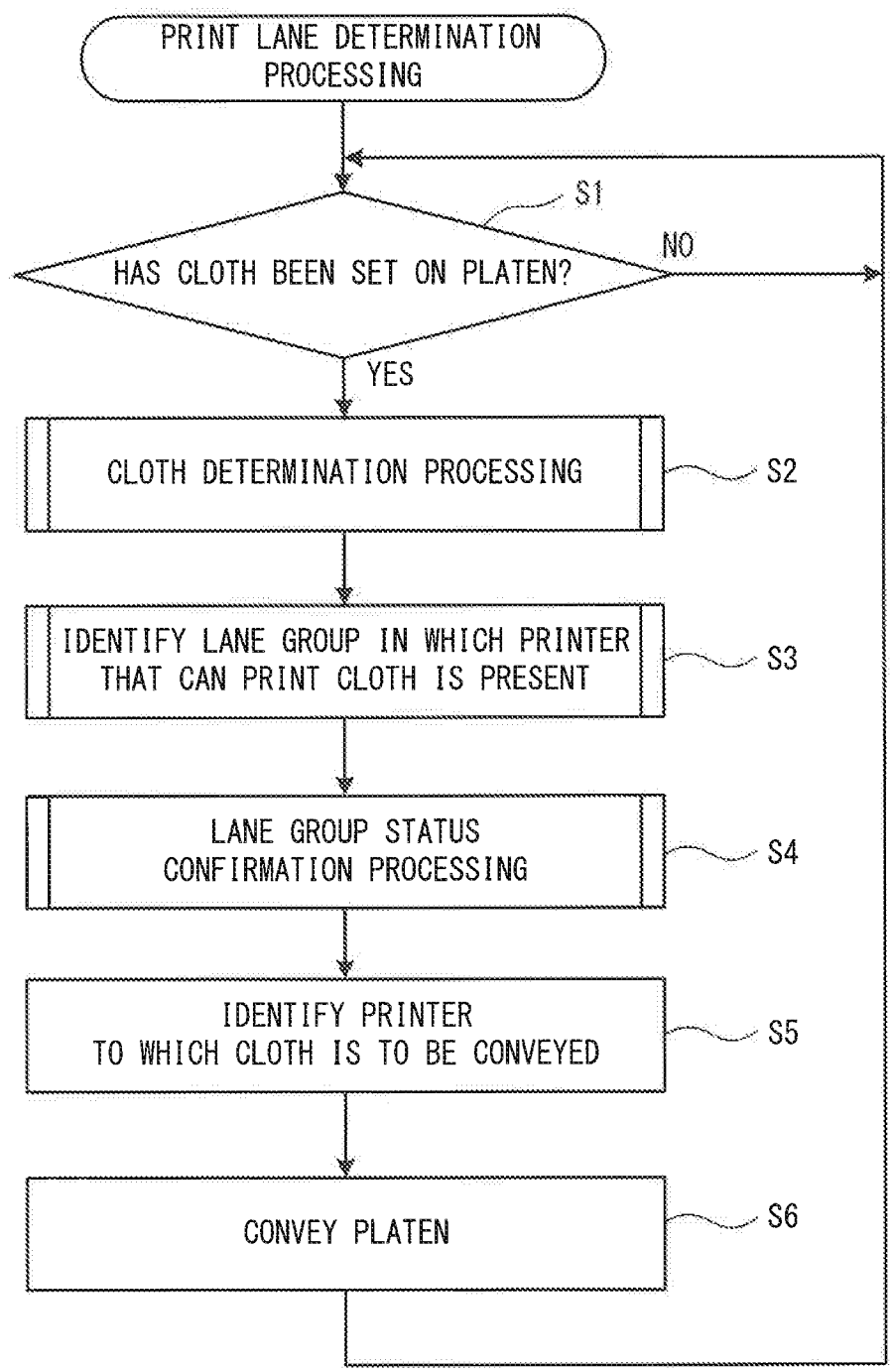
FIG. 4 is a flowchart of print lane determination processing.

First, when a power source of the print system 1 is turned on, the CPU 101 reads out, from the ROM 102, a program for the print lane determination processing shown in FIG. 4, and performs the print lane determination processing. As shown in FIG. 4, First, the CPU 101 determines whether a setting completion command, which indicates that the cloth P is placed on the platen 50 positioned at the preparation position 100, has been received (step S1). For example, when the operator uses the code reader 95 and reads out the identification information of the cloth P from a barcode or an RFID tag on the cloth P placed on the platen 50, the code reader 95 transmits the identification information to the CPU 101. When the CPU 101 receives the identification information of the cloth P from the code reader 95, the CPU 101 determines that the cloth P has been set on the platen 50 (yes at step S1). Next, the CPU 101 performs cloth determination processing (step S2). Note that, when the CPU 101 does not determine YES in the determination at step S1, the determination at step S1 continues.

Figure 5:
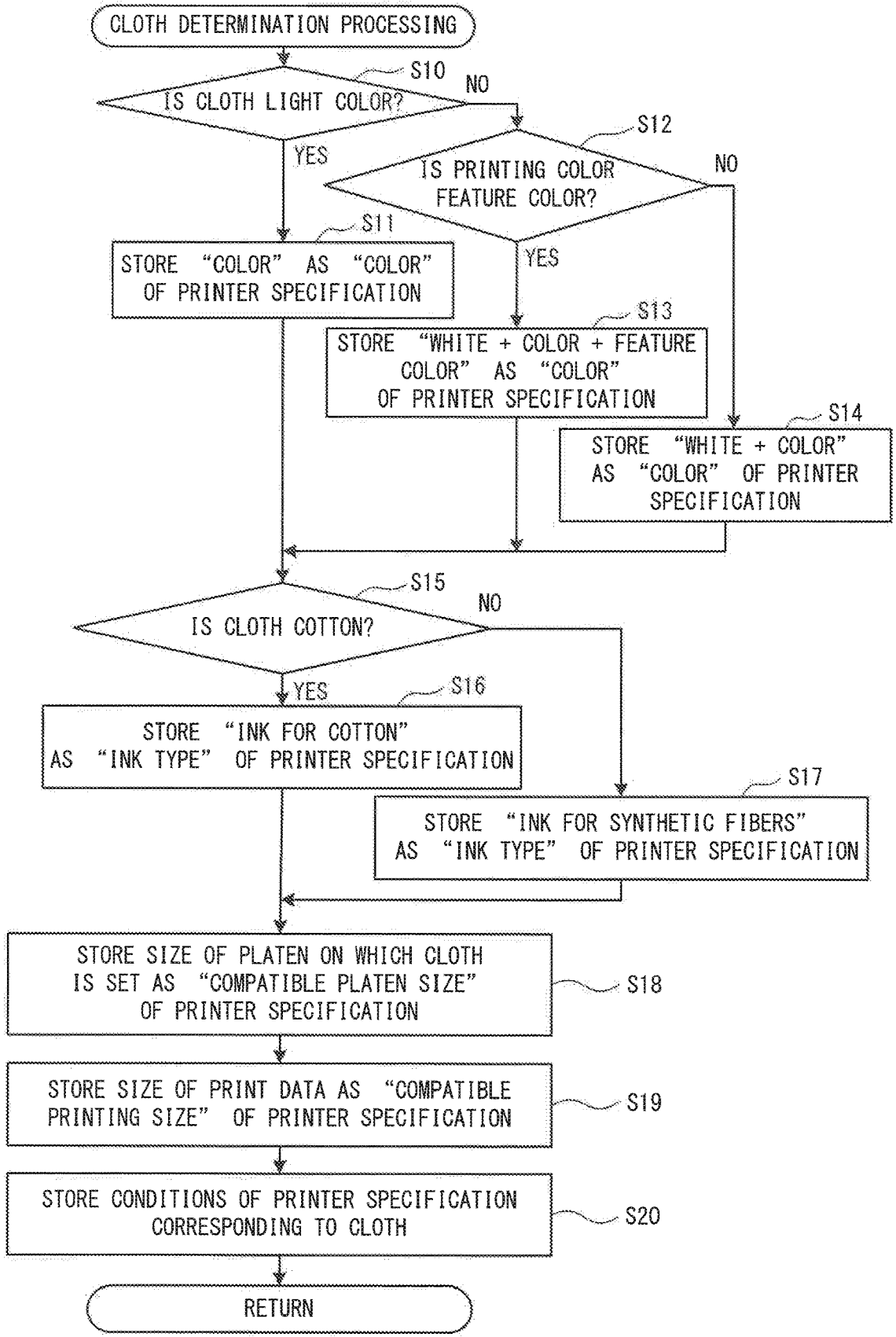
FIG. 5 is a flowchart of cloth determination processing.
Figure 6:
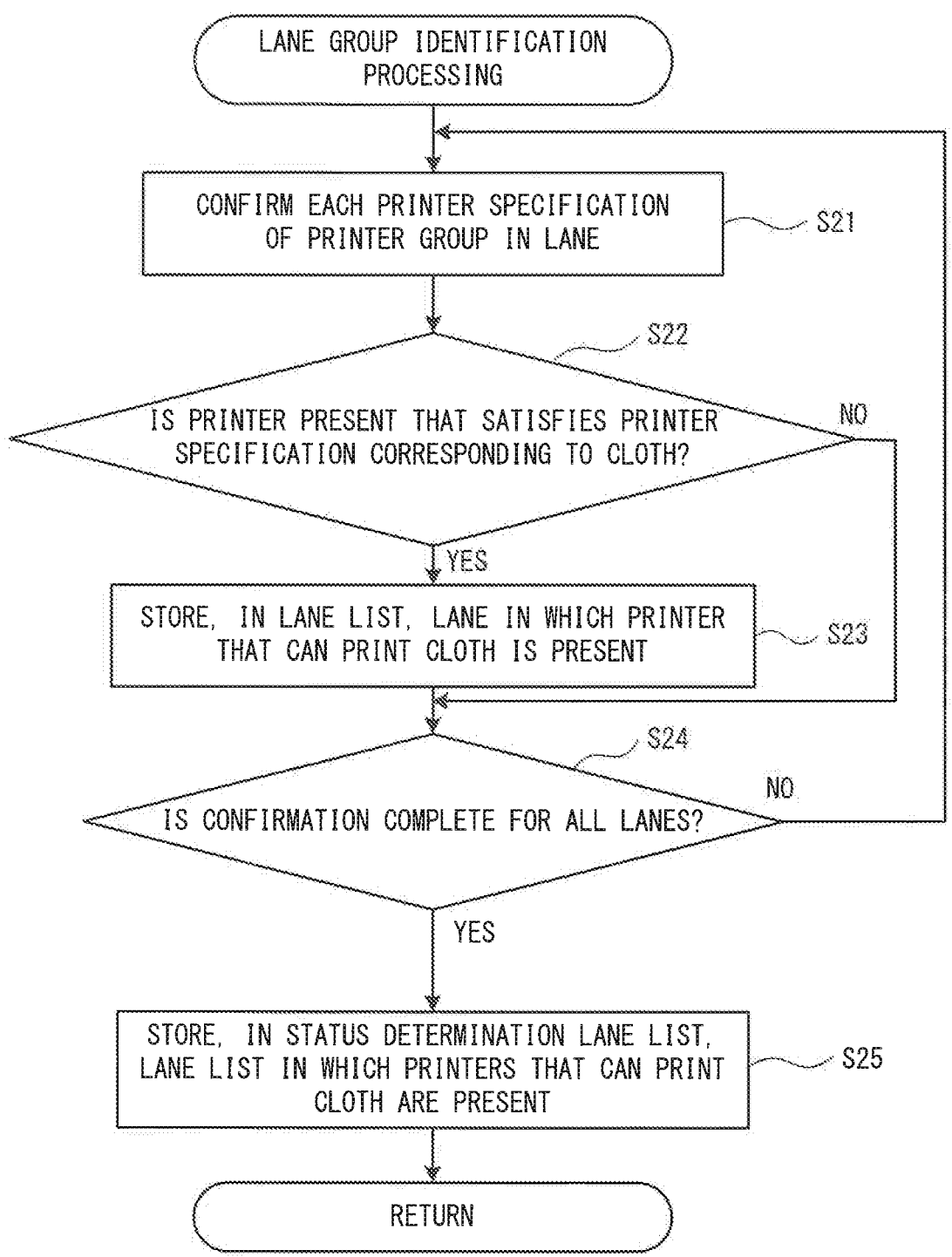
FIG. 6 is a flowchart of lane group identification processing.

The CPU 101 performs the cloth determination processing (step S2) in accordance with a subroutine of the cloth determination processing shown in FIG. 5. In the cloth determination processing, the CPU 101 creates the printer specification 103A on the basis of the identification information of the cloth P received from the code reader 95 and stored in the RAM 103. The printer specification 103A is a table of printer specifications (conditions) required in order for the CPU 101 to perform the printing on the target cloth P. Hereinafter, the cloth determination processing will be explained with reference to FIG. 5, and FIG. 8(A) to FIG. 8(C).

The printer specification 103A to be created will be explained with reference to FIG. 8(A). The storage portion 104 stores a format of the printer specification 103A. Items such as "Color," "Ink type," "Compatible platen size," and "Compatible printing size" can be input into the format. In the cloth determination processing to be described later, on the basis of the identification information of the cloth P received from the code reader 95 and stored in the RAM 103, predetermined information is associated with these items and stored as the printer specification 103A. For example, under "Color," one of the following is stored: color, white+color, or white+color+feature color. Under "Ink type," one of the following is stored: ink for cotton, or ink for synthetic fibers. Under "Compatible platen size," one of the following is stored: size L, size M, or size S. Under "Compatible printing size," a size of a print image to be printed is stored.

In a state before the cloth determination processing is performed, each of the items in the printer specification 103A is a blank field, as shown in FIG. 8(B). In the following working example, from "Type," "Color," "Size," "Printing color," and "Printing size" included in the identification information of the cloth P, using predetermined conversion information stored in the storage portion 104, the CPU 101 can input each of the items of the printer specification 103A.

In the cloth determination processing shown in FIG. 5, first, the CPU 101 determines whether the cloth P placed on the platen 50 is a light color (step S10). The CPU 101 determines whether the cloth P is the light color on the basis of the "Color" of the identification information of the cloth P stored at step S1. For example, when "Color" in the identification information of the cloth P is white, the CPU 101 determines that the cloth P is the light color. When the CPU 101 determines that the cloth P is the light color (yes at step S10), the CPU 101 stores color as the "Color" of the printer specification 103A and advances the processing to step S15. When the CPU 101 determines that the color of the cloth P is the light color (yes at step S10), base printing of a white color is not necessary. Thus, the printing can also be performed using the printers 5A to 5D that are not provided with the white ink.

When the CPU 101 determines that the cloth P is not the light color (no at step S10), the CPU 101 determines whether the printing color is the feature color (step S12). The CPU 101 determines whether the printing color includes the feature colors on the basis of the "Printing color" for the cloth P stored at step S1. For example, when the "Printing color" of the identification information of the cloth P includes red, the CPU 101 determines that the printing color is the feature color. When the CPU 101 determines that the printing color is the feature color (yes at step S12), the CPU 101 stores white+color+feature color as the "Color" of the printer specification 103A, and advances the processing to step S15. When the CPU 101 determines that the printing color is the feature color (yes at step S12), it is necessary to perform the printing using the feature color ink. Thus, the printing can only be performed using the printers 3A to 3D that are provided with the feature color ink.

When the CPU 101 determines that the printing color is not the feature color (no at step S12), the CPU 101 stores white+color as the "Color" of the printer specification 103A (step S14), and advances the processing to step S15. Since the color of the cloth P is not the light color, namely, is a dark color, it is necessary to perform the printing using the base printing using the white ink. Thus, the printing is preferably not performed using the printers 5A to 5D that are not provided with the white ink.

Next, the CPU 101 determines whether the cloth P is cotton (step S15). The CPU 101 determines whether the cloth P is cotton by acquiring information about a material of the cloth P, on the basis of "Type" in the identification information of the cloth P stored in the RAM 103. When the CPU 101 determines that the cloth P is not cotton (no at step S15), the CPU 101 stores an ink suited to the information of the material of the cloth P, in the "Ink type" field of the printer specification 103A. In the present embodiment, in order to simplify the explanation, an example is explained in which the material of the cloth P other than cotton is the synthetic fiber. Thus, the CPU 101 stores ink for synthetic fibers as the "Ink type" of the printer specification 103A (step S17). When the CPU 101 determines that the cloth P is cotton (yes at step S15), the CPU 101 stores ink for cotton as the "Ink type" of the printer specification 103A (step S16).

Next, the CPU 101 stores, in the "Compatible platen size" field of the printer specification 103A, the size of the platen 50 on which the cloth P is to be set (step S18). For example, there are three types of size of the platen 50, namely, S, M, and L, and the size of the cloth P that can be attached to the platen 50 is determined in advance. For example, the S-sized cloth P can be attached to the size S platen 50, the S-sized and M-sized cloth P can be attached to the size M platen 50, and the S-sized, M-sized, and L-sized cloth P can be attached to the size L platen 50. For example, the CPU 101 stores, in the "Compatible platen size" field of the printer specification 103A, the size of the platen 50 to which the cloth P can be attached, on the basis of "Size" in the identification information of the cloth P stored in the RAM 103. For example, when the cloth P is the L-sized cloth P, the CPU 101 stores size L as the "Compatible platen size" of the printer specification 103A.

Next, the CPU 101 stores a printing size of print data in the "Compatible printing size" field of the printer specification 103A (step S19). The CPU 101 acquires the print data corresponding to the identification information, from the storage portion 104, on the basis of "Printing size" in the identification information of the cloth P stored in the RAM 103. The CPU 101 acquires the printing size from the acquired print data, and stores the acquired printing size in the "Compatible printing size" field of the printer specification 103A. An example of the compatible printing size is W inches (W)×Z inches (H). Next, as shown in FIG. 8(C), the CPU 101 stores the completed printer specification 103A corresponding to the cloth P in the RAM 103 (step S20). Thus, it is necessary for the printer that can perform the printing on the cloth P to satisfy the conditions of the printer specification 103A shown in FIG. 8(C). In the present working example, for example, these are the conditions requiring the printer that can perform the color printing, can eject the ink for the synthetic fibers, can use the size L platen 50, and can print an image of W inches (W)×Z inches (H).

Next, the CPU 101 advances the processing to step S3 shown in FIG. 4, and identifies a lane group on which the printers are present that can print the cloth P (step S3). The CPU 101 performs the processing at step S3 in accordance with a subroutine of lane group identification processing shown in FIG. 6. Hereinafter, the lane group identification processing to identify the lane group that is able to print the cloth P will be explained with reference to FIG. 6. First, the CPU 101 confirms each of printer specifications of a printer group in the first lane 81 (step S21). For example, the CPU 101 communicates with each of the printers 3A to 5A of the first lane 81, acquires data about the color of the ink that can be ejected, the type of the ink (the ink for cotton, the ink for synthetic fibers), the size of the platen that the printer can handle, and the printing size that the printer can handle, and confirms the printer specification of each of the printers 3A to 5A. The CPU 101 associates the printer specification with each of the printers 3A to 5A, and stores the associated information in the RAM 103 (step S21). Note that the processing at step S21 may be performed in advance and not at this timing.

Next, the CPU 101 determines whether the printer is present that satisfies the printer specification 103A (refer to FIG. 8(C)) corresponding to the cloth P created in the cloth determination processing and stored in the RAM 103 (step S22). For example, the CPU 101 determines YES when, among the printer specifications of each of the printers 3A to 5A acquired at step S21 and stored in the RAM 103, the printer specification is present that satisfies the "Color," "Ink type," "Compatible platen size," and "Compatible printing size" of the printer specification 103A stored at step S20. When the CPU 101 determines YES in the determination at step S22, the CPU 101 stores the first lane 81 in which the printer is present that can print the cloth P, in a lane list (not shown in the drawings) stored in the RAM 103 (step S23). For example, when the specifications of the printers 3A, 4A, and 5A indicate that the printers 3A, 4A, and 5A can perform the color printing, can eject the ink for the synthetic fibers, can use the size L platen, and can print the image of W inches (W) and Z inches (H), the specifications satisfy the printer specification 103A shown in FIG. 8(C). Thus, the CPU 101 stores the first lane 81, on which the printers 3A to 5A are present, in the lane list. Note that information relating to the arrangement of the printers 3A to 5D provided on each of the first lane 81 to the fourth lane 84 is stored in the ROM 102 in advance. For example, when at least one of the printers 3A to 5A satisfies the printer specification 103A, the CPU 101 stores the first lane 81 in the lane list. When the CPU 101 determines NO in the determination at step S22, the CPU 101 advances the processing to step S24.

Next, the CPU 101 determines whether the confirmation is complete for all of the lanes (step S24). In the above example, the CPU 101 has only confirmed the first lane 81, and has not confirmed the second lane 82 to the fourth lane 84. Thus, the CPU 101 determines NO in the determination processing at step S24, and returns the processing to step S21. Next, in a similar manner, the CPU 101 performs the processing from step S21 to step S23 with respect to the second lane 82. Next, the CPU 101 determines NO in the determination processing at step S24, and returns the processing to step S21. Next, in a similar manner, the CPU 101 performs the processing from step S21 to step S23 with respect to the third lane 83. Next, the CPU 101 determines NO in the determination processing at step S24, and returns the processing to step S21. Next, in a similar manner, the CPU 101 performs the processing from step S21 to step S23 with respect to the fourth lane 84. When the CPU 101 finishes the determination as to whether or not the printers in all of the lanes from the first lane 81 to the fourth lane 84 satisfy the printer specification corresponding to the cloth P, the CPU 101 determines that the confirmation of all the lanes is complete (yes at step S24). When the CPU 101 determines that the confirmation of all the lanes is complete (yes at step S24), the CPU 101 stores the lane list in which the printers that can print the cloth P are present in a status determination lane list (not shown in the drawings) that is used to perform status determination (step S25). For example, the status determination lane list is stored in the RAM 103. For example, when the printers that can print the cloth P are the printers 3A to 5A, only the first lane 81 is stored in the lane list on which the printers that can print the cloth P are present, and thus, the CPU 101 stores the first lane 81 in the status determination lane list (step S25).

Next, the CPU 101 advances the processing to step S4 shown in FIG. 4, and performs lane group status confirmation processing (step S4). The CPU 101 performs processing at step S4 in accordance with a subroutine of the lane group status confirmation processing shown in FIG. 7. For example, when the first lane 81 is present in the status determination lane list, the first lane 81 is a target of the determination processing at step S4.

Figure 7:
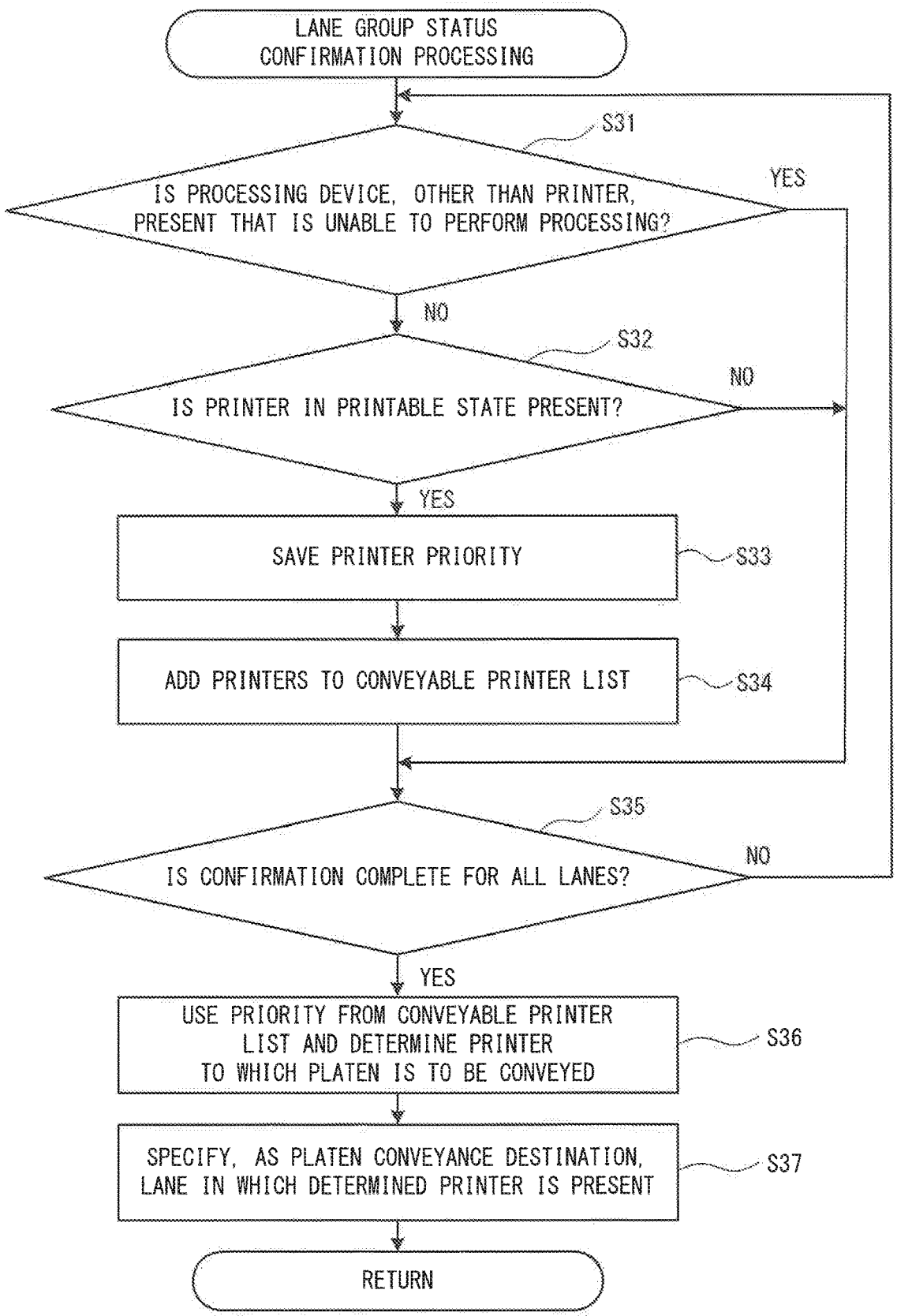
FIG. 7 is a flowchart of lane group status confirmation processing.

Hereinafter, the lane group status confirmation processing will be explained with reference to FIG. 7. First, the CPU 101 determines whether, of processing devices apart from the printers 3A to 5A provided in the first lane 81 stored in the status determination lane list, a device is present that is unable to perform processing (step S31). For example, the pretreatment device 2A that is the processing device other than the printers 3A to 5A is provided in the first lane 81. The CPU 101 receives, from the pretreatment device 2A, a status signal indicating a state of the device, and determines whether the device is unable to perform the processing. When a post-processing device that is not shown in the drawings is provided in the first lane 81, the pretreatment device 2A and the post-processing device are an example of the processing device other than the printers 3A to 5A. In this case, the CPU 101 receives the status signal indicating the status of the device from the posts-processing device also, and determines whether the device is unable to perform the processing. When the CPU 101 determines that the processing device, other than the printers 3A to 5A, that is unable to perform the processing is present (yes at step S31), the CPU 101 advances the processing to step S35 to be described later. When the CPU 101 determines that the processing device, other than the printers 3A to 5A, that is unable to perform the processing is not present (no at step S31), the CPU 101 determines whether the printer that is in a printable state is present (step S32). For example, the CPU 101 communicates with each of the printers 3A to 5A, receives a status signal indicating the state of each of the printers 3A to 5A, and determines whether the printer that is in the printable state is present. Next, when the CPU 101 determines that the printer that is in the printable state is present (yes at step S32), the CPU 101 stores and saves, in the RAM 103, a priority of the printer that can perform the printing (step S33).

An example of the priority of the printer will be explained with reference to a priority table 104A shown in FIG. 9. The priority table 104A is created in advance and stored in the storage portion 104. States of the printers, an order of priority, details of the states, and supplementary information are stored in the priority table 104A. The printers include printers that have indicated a printable state and printers that have indicated an unprintable state. For example, the printers that have indicated the printable state are ranked first to fifth in the order of priority, and the smaller the number, the higher the priority. The first priority indicates that the printing can be immediately performed by the printer and that the platen 50 is not present in the printer. The second priority indicates that the printing is being performed by the printer, and that it will take 20 seconds or less until the printing is complete. The third priority indicates that the printing is being performed by the printer, and that it will take 20 seconds or more and 40 seconds or less until the printing is complete. The fourth priority indicates that the printing is being performed by the printer, and that it will take 10 seconds to convey the platen 50 into the printer and thereafter it will take 40 seconds or more and 60 seconds or less until the printing is complete. The fifth priority indicates that an operation other than the printing operation, such as a maintenance operation, is being performed on the printer, and that 30 seconds are required for the operation and thereafter it will take 40 seconds or more and 60 seconds or less until the printing is complete. Examples of the maintenance operation include flushing of the ink before the printing, wiping of the head, and the like. The maintenance operation is performed each time twenty recording media are printed, for example. The printable state is prescribed in advance using, as a reference, a time period required to complete the printing, for example. The printable state includes, for example, a case in which the printing can be immediately started by the printer, and a case in which, although other printing is currently being performed and the printing cannot be immediately started, new printing can be started after a predetermined time period and the printing can be completed within a predetermined time period. The unprintable state is a case other than the printable state.

The printers that have indicated the unprintable state include printers that are ranked sixth to eighth in the order of priority, and three printers that are out of target (denoted by an × mark). The smaller the number, the higher the priority. Operations during which the printing by the printers 3 to 5 is impossible include a periodic operation that is performed periodically and an irregular operation that is performed on an irregular basis. With respect to the periodic operation, estimation of an end time is possible, and with respect to the irregular operation, the estimation of the end time is impossible. The periodic operation is, for example, a related operation of which the end time can be calculated. Examples of the related operation include a periodic replenishment operation of the ink that is supplied to the printers 3 to 5, and the maintenance operation for the printers 3 to 5. The maintenance operation that is completed within 30 seconds or less may correspond to the fifth priority. Examples of the maintenance operation include a periodic purge operation that sucks up the ink from nozzles (not shown in the drawings) of the head (not shown in the drawings), a periodic flushing operation that ejects the ink from the nozzles of the head, a periodic wipe operation that wipes a nozzle surface (not shown in the drawings) of the head using a wiper, a periodic circulation operation that circulates the ink inside an ink supply path (not shown in the drawings) and the head, and a periodic agitation operation that agitates the ink inside an ink tank (not shown in the drawings). The maintenance operation may be a periodic operation regardless of the maintenance completion time. The related operation is a carrying-in operation or a carrying-out operation of the platen 50 at the preparation position 100.

The sixth priority indicates that periodic replacement of an ink cartridge is in progress or that the replenishment of the ink to the ink tank is in progress. The seventh priority indicates that the platen 50 is being discharged from the printer. The eighth priority indicates that the purging of the ink from the head (not shown in the drawings) is in progress. The periodic purge operation is performed once in six to seven hours, for example, and it takes about five to six minutes. The sixth to eighth priorities indicate the periodic operation of the printer. "Out of target" (denoted by the × mark) indicates the irregular operation, and indicates the power source OFF of the printer, a MACHINE ERROR such as ink empty, and opening of a printer cover.

Figure 10:
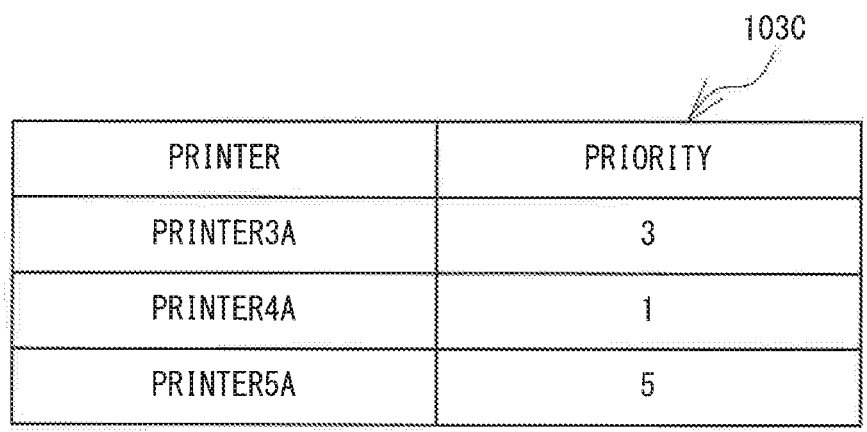
FIG. 10 is a conveyable printer list 103C.

Next, the CPU 101 stores and saves the priority of the printer in the RAM 103 (step S33). Next, the CPU 101 adds the priority of the printer saved in the RAM 103 in the step S33, in association with the printer that can perform the printing, to a conveyable printer list 103C shown in FIG. 10 (step S34). For example, when all the printers 3A to 5A that have indicated the printable state, when the priority is "3" for the printer 3A, "1" for the printer 4A and "5" for the printer 5A, the CPU 101 stores the printer 3A in a printer field of the conveyable printer list 103C, and stores 3 in a priority field. Further, the CPU 101 stores the printer 4A in the printer field and stores 1 in the priority field, and further stores the printer 5A in the printer field and stores 5 in the priority field.

Next, the CPU 101 determines whether the confirmation is complete for all the target lanes (step S35). In the present example, as described above, the CPU 101 has performed the processing from step S31 to step S34 for the first lane 81 as the target lane, and thus, when the CPU 101 completes the confirmation for the printers 3A to 5A of the first lane 81, the CPU 101 determines that the confirmation of all the target lanes is complete (yes at step S35). When the CPU 101 determines YES in the determination at step S31, or when the CPU 101 determines NO in the determination at step S32, the CPU 101 advances the processing to step S35. When the lane other than the first lane 81 is registered in the status determination lane list, when the CPU 101 completes the processing from step S31 to step S34 with respect to all of the lanes registered in the lane list, the CPU 101 determines that the confirmation is complete for all of the lanes (yes at step S35). When the CPU 101 determines that the confirmation is not complete for all of the lanes (no at step S35), the CPU 101 returns the processing to step S31.

When the CPU 101 determines that the confirmation is complete for all of the lanes (yes at step S35), the CPU 101 determines the printer to which the platen 50 is to be conveyed, using the priority from the conveyable printer list 103C stored in the RAM 103 (step S36). The CPU 101 determines the printer having a higher priority, from among the printers stored in the conveyable printer list 103C, as the printer to which the platen 50 is to be conveyed. When the priorities of the printers are the same as each other, the CPU 101 determines, for example, the printer closer to the preparation position 100 as the printer to which the platen 50 is to be conveyed (step S36). In the conveyable printer list 103C shown in FIG. 10, the printer 4A having the priority of "1" is the printer with the highest priority, and thus, the CPU 101 determines the printer 4A as the printer to which the platen 50 is to be conveyed (step S36). Next, the CPU 101 specifies the lane in which the determined printer is present to be a conveyance destination (step S37). The CPU 101 specifies the first lane 81 in which the printer 4A is present as the conveyance destination of the platen 50. Next, the CPU 101 advances the processing to step S5 shown in FIG. 4. The CPU 101 identifies the printer to which the cloth P is to be conveyed (step S5). The CPU 101 identifies the printer 4A determined at step S36 as the printer to which the cloth P is to be conveyed. Next, the CPU 101 conveys the platen 50 to the printer identified at step S5 (step S6). The CPU 101 conveys the platen 50 to the first lane 81, and conveys the platen 50 to the printer 4A. The conveyance of the platen 50 is performed in accordance with the principles of the platen conveyance operation described above. Next, the CPU 101 returns the processing to step S1. Note that, when the printer to which the platen 50 can be conveyed is not stored in the conveyable printer list 103C in the processing at step S36, the CPU 101 does not determine the printer to which the platen 50 is to be conveyed. In this case, the CPU 101 advances the processing to step S5 without specifying, in the processing at step S37, the lane that is the conveyance destination of the platen 50. In the processing at step S5, the CPU 101 returns the processing to step S1 without identifying the printer to which the cloth P is to be conveyed, and without conveying the platen 50 in the processing at step S6.

As described above, the conveyance control device 1A of the print system 1 according to the present embodiment is provided with the CPU 101 that controls the platen conveyance mechanism 10, which conveys the platen 50 to one of the plurality of printers 3A to 5D via the pretreatment device 2A or the pretreatment device 2B. The CPU 101 performs the determination steps (step S2 to step S5), in which it is determined to which of the printers 3A to 5D the platen 50 is to be conveyed, on the basis of the cloth P placed on the platen 50. The CPU 101 determines the printer to which the platen 50 is to be conveyed on the basis of the cloth P placed on the platen 50, and thus, the platen 50 is conveyed to the one of the printers 3A to 5D that is suited to the printing of the cloth P. A print processing volume in a certain period is therefore increased.

In the determination steps (step S2 to step S5), the CPU 101 determines to which of the plurality of printers 3A to 5D the platen 50 is to be conveyed, on the basis of the color of the cloth P. Therefore, since the CPU 101 determines to which of the printers 3A to 5D the platen 50 is to be conveyed on the basis of the color of the cloth P, one of the printers 3A to 5D that is suited to the printing of the cloth P having that color can be specified as the conveyance destination of the platen 50.

In the determination steps (step S2 to step S5), the CPU 101 determines to which of the plurality of printers 3A to 5D the platen 50 is to be conveyed, on the basis of the type of the cloth P, namely cotton, synthetic fibers, or the like. Since the CPU 101 determines to which of the printers 3A to 5D the platen 50 is to be conveyed on the basis of the type of the cloth P, one of the printers 3A to 5D that is suited to the printing of the cloth P of that type can be specified as the conveyance destination of the platen 50.

The CPU 101 determines the printer to which the platen 50 is to be conveyed, on the basis of the size of the cloth P. The CPU 101 can therefore designate one of the printers 3A to 5D that is suited to the printing of the cloth P of that size, as the conveyance destination of the platen 50.

In the determination steps (step S2 to step S5), the CPU 101 determines to which of the plurality of printers 3A to 5D the platen 50 is to be conveyed, on the basis of the printing color on the cloth P. The CPU 101 can therefore designate one of the printers 3A to 5D that is suited to the printing of that printing color, as the conveyance destination of the platen 50.

In the determination steps (step S2 to step S5), the CPU 101 determines to which of the plurality of printers 3A to 5D the platen 50 is to be conveyed, on the basis of the printing size of the cloth P. The CPU 101 can therefore designate one of the printers 3A to 5D that is suited to the printing of that printing size, as the conveyance destination of the platen 50.

In the above-described embodiment, the conveyance control device 1A is an example of a "conveyance control device" of the present invention. The CPU 101 is an example of a "computer" or a "processor" of the present invention. Steps S2 to S5 are an example of "determination processing" of the present invention. The platen conveyance mechanism 10 is an example of a "conveyance portion" of the present invention. The preparation position 100 is an example of a "conveyance start position" of the present invention. The step at S2 is an example of "acquisition processing" of the present invention. The steps at S3 and S5 are an example of "identification processing" of the present invention.

The present disclosure is not limited to the above-described embodiment and various modifications are possible. The print system 1 of the above-described embodiment may be provided with a post-treatment device. The post-treatment device is disposed to the rear of the printers 3A to 5D, and heats the printed cloth P placed on the platen 50 at a high temperature. Thus, the ink dries and the fixation of the ink on the cloth P is improved. The pretreatment devices 2A and 2B may be respectively provided in each of the first lane 81 to the fourth lane 84. The platen conveyance mechanism 10 may further be provided, to the right of the fourth lane 84, with a processing line provided with three of the printers, in a similar manner to the first lane 81 and the second lane 82. The number of the printers on each of the lanes is not limited to three, and a desired plurality of printers may be provided, such as two, four, five, or the like. When the number of the printers increases, the print processing volume in the certain period increases. Printers that can perform high speed printing may be provided. An example of the printer that can perform high speed printing is a printer having a large number of heads, for example. Using the printer that can perform the high speed printing, it is possible to print the print data of a large printing size at high speed.

The priority table 104A is not limited to that shown in FIG. 9. The operator may create a priority table as appropriate in advance. In the processing at step S36, when there are a plurality of the printers having the same priority level, instead of selecting the printer closer to the conveyance start position 100, the CPU 101 may select the printer for which a selection order is specified in advance. The determination as to whether the cloth P has been set on the platen (step S1) may be made when the operator places the cloth P on the platen 50 and inputs a set completion command from the operation portion 110 and the CPU 101 receives the set completion command. In the determination as to whether the cloth P is the light color (step S10), the CPU 101 may make the determination on the basis of a command as to whether the cloth P is the light color or not input by the operator operating the operation portion 110. In the determination as to whether the cloth P is cotton or synthetic fibers (step S15), the CPU 101 may make the determination on the basis of a command as to whether the cloth P is cotton or synthetic fibers input by the operator operating the operation portion 110. The addition of the size of the platen 50 to the printer specification 103A (step S18) may be performed by the CPU 101 receiving a command indicating the size of the platen input from the operation portion 110. The addition of the printing size to the printer specification 103A (step S19) may be performed by the CPU 101 receiving a command indicating the printing size input from the operation portion 110.

The CPU 101 performs the print lane determination processing shown in FIG. 4, but CPUs separate from the CPU 101 may be provided in each of the first lane 81, the conveyance mechanisms 15, 17, and 19, and the like, and these CPUs may perform the determination.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A conveyance control device comprising:
   a processor configured to control a conveyance portion, the processor being provided separately from a platen and not conveyed together with the platen, the conveyance portion being configured to convey the platen from a conveyance start position of the platen to one of a plurality of digital printers via a pretreatment device, the pretreatment device being configured to perform pretreatment on a recording medium placed on the platen, the pretreatment being at least one of a heating process or a discharge process that discharges a pretreatment agent prior to an ink discharged from the plurality of digital printers, the plurality of digital printers including a first digital printer and a second digital printer, the first digital printer differing from the second digital printer in at least one of an ink type corresponding to a type of the recording medium, a usable size of the platen, or a printable size of a print image; and
   a memory storing computer-readable instructions that, when executed by the processor, perform processes including:
   performing acquisition processing to acquire identification information identifying at least one of the recording medium, a printing color on the recording medium, or a printing size on the recording medium; and
   determination processing of determining, on a basis of the identification information acquired in the acquisition processing, which of the plurality of digital printers, including the first digital printer and the second digital printer, the platen is to be conveyed to.

2. The conveyance control device according to claim 1, wherein
   the identification information further includes a color of the recording medium, and
   the processor, in the determination processing, on the basis of the color of the recording medium, determines which of the plurality of digital printers the platen is to be conveyed to.

3. The conveyance control device according to claim 1, wherein
   the identification information further includes a type of the recording medium, and
   the processor, in the determination processing, on the basis of the type of the recording medium, determines which of the plurality of digital printers the platen is to be conveyed to.

4. The conveyance control device according to claim 1, wherein
   the identification information further includes a size of the recording medium, and0
   the processor, in the determination processing, on the basis of the size of the recording medium, determines which of the plurality of digital printers the platen is to be conveyed to.

5. The conveyance control device according to claim 1, wherein
   the processor, in the determination processing, on the basis of at least one of the recording medium placed on the platen, the printing color on the recording medium or the printing size on the recording medium, which of the plurality of digital printers the platen is to be conveyed to, wherein at least two of the plurality of digital printers are configured to perform a color printing process on the basis of print data.

6. The conveyance control device according to claim 1, wherein
   the ink type corresponding to the type of the recording medium is a type of an ink corresponding to a color of the recording medium or the type of the ink corresponding to a material of the recording medium.

7. A conveyance control method in which a processor controls a conveyance portion, the processor being provided separately from a platen and not conveyed together with the platen, the conveyance portion being configured to convey the platen from a conveyance start position of the platen to one of a plurality of digital printers via a pretreatment device, the pretreatment device being configured to perform pretreatment on a recording medium placed on the platen, the pretreatment being at least one of a heating process or a discharge process that discharges a pretreatment agent prior to an ink discharged from the plurality of digital printers, the plurality of digital printers including a first digital printer and a second digital printer, the first digital printer differing from the second digital printer in at least one of an ink type corresponding to a type of the recording medium, a usable size of the platen, or a printable size of a print image, the conveyance control method comprising:
   acquisition processing to acquire identification information identifying at least one of the recording medium, a printing color on the recording medium, or a printing size on the recording medium; and
   determination processing of determining, on a basis of the identification information acquired in the acquisition processing, which of the plurality of digital printers, including the first digital printer and the second digital printer, the platen is to be conveyed to.

8. The conveyance control method according to claim 7, wherein the processor, in the determination processing, on the basis of at least one of the recording medium placed on the platen, the printing color on the recording medium or the printing size on the recording medium, which of the plurality of digital printers the platen is to be conveyed to, wherein at least two of the plurality of digital printers are configured to perform a color printing process on the basis of print data.

9. The conveyance control method according to claim 7, wherein
the ink type corresponding to the type of the recording medium is a type of an ink corresponding to a color of the recording medium or the type of the ink corresponding to a material of the recording medium.

10. A non-transitory computer-readable medium storing computer-readable instructions that, when executed by a computer, controls a conveyance portion, the computer being provided separately from a platen and not conveyed together with the platen, the conveyance portion being configured to convey the platen from a conveyance start position of the platen to one of a plurality of digital printers via a pretreatment device, the pretreatment device being configured to perform pretreatment on a recording medium placed on the platen, the pretreatment being at least one of a heating process or a discharge process that discharges a pretreatment agent prior to an ink discharged from the plurality of digital printers, the plurality of digital printers including a first digital printer and a second digital printer, the first digital printer differing from the second digital printer in at least one of an ink type corresponding to a type of the recording medium, a usable size of the platen, or a printable size of a print image, perform:
acquisition processing to acquire identification information identifying at least one of the recording medium, a printing color on the recording medium, or a printing size on the recording medium; and
determination processing of determining, on a basis of the identification information acquired in the acquisition processing, which of the plurality of digital printers, including the first digital printer and the second digital printer, the platen is to be conveyed to.

11. The non-transitory computer-readable medium storing computer-readable instructions according to claim 10, wherein
the computer, in the determination processing, on the basis of at least one of the recording medium placed on the platen, the printing color on the recording medium or the printing size on the recording medium, which of the plurality of digital printers the platen is to be conveyed to, wherein at least two of the plurality of digital printers are configured to perform a color printing process on the basis of print data.

12. The non-transitory computer-readable medium storing computer-readable instructions according to claim 10, wherein
the ink type corresponding to the type of the recording medium is a type of an ink corresponding to a color of the recording medium or the type of the ink corresponding to a material of the recording medium.

* * * * *